United States Patent
Elliott

(10) Patent No.: US 7,457,416 B1
(45) Date of Patent: Nov. 25, 2008

(54) KEY DISTRIBUTION CENTER FOR QUANTUM CRYPTOGRAPHIC KEY DISTRIBUTION NETWORKS

(75) Inventor: Brig Barnum Elliott, Arlington, MA (US)

(73) Assignee: BBN Technologies Corp., Cambridge, MA (US)

( * ) Notice: Subject to any disclaimer, the term of this patent is extended or adjusted under 35 U.S.C. 154(b) by 744 days.

(21) Appl. No.: 10/197,659

(22) Filed: Jul. 17, 2002

(51) Int. Cl.
  *H04K 1/00* (2006.01)
  *H04L 9/00* (2006.01)
(52) U.S. Cl. .................. 380/256; 380/278; 713/171
(58) Field of Classification Search ............... 380/256, 380/278; 713/171
  See application file for complete search history.

(56) References Cited

U.S. PATENT DOCUMENTS

| | | | |
|---|---|---|---|
| 4,445,116 A | 4/1984 | Grow | |
| 4,649,233 A | 3/1987 | Bass et al. | |
| 4,770,535 A | 9/1988 | Kim et al. | |
| 5,058,973 A | 10/1991 | Refregier et al. | |
| 5,243,649 A | 9/1993 | Franson | 380/9 |
| 5,307,410 A | 4/1994 | Bennett | 380/21 |
| 5,311,572 A | 5/1994 | Friedes et al. | |
| 5,339,182 A | 8/1994 | Kimble et al. | 359/112 |
| 5,400,325 A | 3/1995 | Chatwani et al. | |
| 5,414,771 A | 5/1995 | Fawcett, Jr. | 380/44 |
| 5,469,432 A | 11/1995 | Gat | |
| 5,502,766 A | 3/1996 | Boebert et al. | |
| 5,515,438 A | 5/1996 | Bennett et al. | |
| 5,535,195 A | 7/1996 | Lee | |
| 5,602,916 A | 2/1997 | Grube et al. | |
| 5,675,648 A | 10/1997 | Townsend | 380/21 |
| 5,710,773 A | 1/1998 | Shiga | |
| 5,729,608 A * | 3/1998 | Janson et al. | 713/171 |
| 5,732,139 A | 3/1998 | Lo et al. | 380/28 |
| 5,757,912 A | 5/1998 | Blow | 380/21 |
| 5,764,765 A | 6/1998 | Phoenix et al. | 380/21 |
| 5,764,767 A | 6/1998 | Beimel et al. | |
| 5,768,378 A | 6/1998 | Townsend et al. | 380/21 |

(Continued)

OTHER PUBLICATIONS

DeBashis Basak, Daniel O. Awduche, John Drake and Yakov Redhter, Multi-protocol Lambda Switching: Issues in Combining MLPS Traffic Engineering Control with Optical Cross-connects, IEFT Internet Draft Memo, http://www.ieft.org/shadowhtml, Feb. 2000, pp. 1-9.

(Continued)

*Primary Examiner*—Christopher J Brown
(74) *Attorney, Agent, or Firm*—Ropes & Gray LLP

(57) ABSTRACT

Methods and systems are provided for distributing key information by securely transmitting light information in a network along a path comprised of a plurality of network devices and by using a key distribution center (KDC) connected with the network. Three or more user devices connected with the network are specified as constituting a secure communication group. Each user device sets up an end-to-end path to the KDC by configuring at least one of the network devices to direct light information along the path. Thereafter, a user key is established between each user device and the KDC, by sending light information using randomly selected quantum bases through the path. The KDC determines a shared secret key, and notifies each user device of the shared secret key by sending the result of a calculation based on the shared secret key and each user key through the network.

23 Claims, 4 Drawing Sheets

U.S. PATENT DOCUMENTS

| | | | |
|---|---|---|---|
| 5,768,391 A | 6/1998 | Ichikawa | |
| 5,805,801 A | 9/1998 | Holloway et al. | |
| 5,850,441 A | 12/1998 | Townsend et al. | 380/21 |
| 5,911,018 A | 6/1999 | Bischel et al. | 385/16 |
| 5,953,421 A | 9/1999 | Townsend | 380/21 |
| 5,960,131 A | 9/1999 | Fouquet et al. | 385/17 |
| 5,960,133 A | 9/1999 | Tomlinson | 385/18 |
| 5,966,224 A | 10/1999 | Hughes et al. | 359/112 |
| 6,005,993 A | 12/1999 | MacDonald | 385/16 |
| 6,028,935 A | 2/2000 | Rarity et al. | |
| 6,052,465 A | 4/2000 | Gotoh et al. | |
| 6,097,696 A | 8/2000 | Doverspike | |
| 6,122,252 A | 9/2000 | Aimoto et al. | |
| 6,130,780 A | 10/2000 | Jaonnopoulos et al. | 359/584 |
| 6,145,024 A | 11/2000 | Maezawa et al. | |
| 6,154,586 A * | 11/2000 | MacDonald et al. | 385/18 |
| 6,160,651 A | 12/2000 | Chang et al. | |
| 6,188,768 B1 | 2/2001 | Bethune et al. | |
| 6,233,075 B1 | 5/2001 | Chang et al. | |
| 6,233,393 B1 | 5/2001 | Yanagihara et al. | |
| 6,272,548 B1 | 8/2001 | Cotter et al. | |
| 6,289,104 B1 | 9/2001 | Patterson et al. | |
| 6,341,127 B1 | 1/2002 | Katsube et al. | |
| 6,378,072 B1 * | 4/2002 | Collins et al. | 713/187 |
| 6,430,345 B1 | 8/2002 | Dultz et al. | |
| 6,463,060 B1 | 10/2002 | Sato et al. | |
| 6,507,012 B1 | 1/2003 | Medard et al. | |
| 6,519,062 B1 | 2/2003 | Yoo | |
| 6,529,498 B1 | 3/2003 | Cheng | |
| 6,532,543 B1 | 3/2003 | Smith et al. | |
| 6,538,990 B1 | 3/2003 | Prorock | |
| 6,539,410 B1 | 3/2003 | Klass | |
| 6,560,707 B2 | 5/2003 | Curtis et al. | |
| 6,563,796 B1 | 5/2003 | Saito | |
| 6,594,055 B2 | 7/2003 | Snawerdt | |
| 6,605,822 B1 | 8/2003 | Blais et al. | |
| 6,646,727 B2 | 11/2003 | Saleh et al. | |
| 6,647,010 B1 | 11/2003 | Ford et al. | |
| 6,650,805 B2 | 11/2003 | Chen et al. | |
| 6,654,346 B1 | 11/2003 | Mahalingaiah et al. | |
| 6,678,379 B1 | 1/2004 | Mayers et al. | |
| 6,684,335 B1 | 1/2004 | Epstein et al. | |
| 6,728,281 B1 | 4/2004 | Santori et al. | |
| 6,748,434 B2 | 6/2004 | Kavanagh | |
| 6,754,214 B1 | 6/2004 | Mahalingaiah | |
| 6,778,557 B1 | 8/2004 | Yuki et al. | |
| 6,799,270 B1 | 9/2004 | Bull et al. | |
| 6,801,626 B1 | 10/2004 | Nambu | |
| 6,836,463 B2 | 12/2004 | Garcia-Luna-Aceves et al. | |
| 6,862,564 B1 | 3/2005 | Shue et al. | |
| 6,882,431 B2 | 4/2005 | Teich et al. | |
| 6,895,092 B2 | 5/2005 | Tomita | |
| 6,897,434 B1 | 5/2005 | Kumar et al. | |
| 6,986,056 B1 | 1/2006 | Dultz et al. | |
| 7,035,411 B2 | 4/2006 | Azuma et al. | |
| 2002/0015573 A1 | 2/2002 | Ishibashi | |
| 2002/0021467 A1 | 2/2002 | Oefk et al. | |
| 2002/0025041 A1 | 2/2002 | Tomita | |
| 2002/0097874 A1 | 7/2002 | Foden et al. | |
| 2002/0141019 A1 | 10/2002 | Chang et al. | |
| 2003/0002674 A1 * | 1/2003 | Nambu et al. | 380/256 |
| 2003/0059157 A1 * | 3/2003 | DeCusatis et al. | 385/24 |
| 2003/0231771 A1 | 12/2003 | Gisin et al. | |
| 2004/0005056 A1 | 1/2004 | Nishioka et al. | |
| 2004/0008843 A1 * | 1/2004 | Van Enk | 380/256 |
| 2004/0019676 A1 | 1/2004 | Iwatsuki et al. | |
| 2004/0109564 A1 | 6/2004 | Cerf et al. | |
| 2004/0136321 A1 | 7/2004 | Ren et al. | |
| 2004/0165884 A1 | 8/2004 | Al-Chalabi | |
| 2004/0190725 A1 | 9/2004 | Yuan et al. | |
| 2005/0094818 A1 | 5/2005 | Inoue et al. | |

OTHER PUBLICATIONS

Daniel O. Awduche, Yakov Rekhter, John Drake and Rob Coutun, Mullti-protocol Lambda Switching: Combining MPLS Traffic Engineering Control with Optical Crossconnects, IETF Internet Draft Memo, http://www.ietf.org/shadow.html, Jan. 2001, pp. 21.

Charles H. Bennett and Gilles Brassard, Quantum Cryptography: Public Key Distribution and Coin Tossing, Intl. Conf. On Computers, Systems & Signal Processing, Bangalore, India, Dec. 10-12, 1984, 5 pages.

Donald S. Bethune and Williams P. Risk, Prototype Autocompensated Quantum Cryptography System Based on Polarization Splitting of Light, Session QC41, DCOMP/CCP99: Quantum Computing and Cryptography, MAr. 24, 1999 (4 pages).

D.S. Bethune and W.P. Risk, An Autocompensating Fiber-Optic Quantum Crytopgraphy System Based on Polarization Splitting of Light, IEEE Journal of Quantum Electronics, vol. XX, No. Y, 1999.

Graham P. Collins, Quantum Cryptography Defies Eavesdropping, Physics Today, Nov. 1992, p. 21-23.

L.Y. Lin, E.L. goldstein and R.W. Tkach, Free-Space Micromachined Optical Switches for Optical Networking, IEEE Journal of Selected Topics in Quantum Electronics, vol. 5, No. 1, Jan./Feb. 1999.

S. Eisenberg and R. Boger, Lucent Technologies names Cherry Murray Physical Science Research Vice President, http://www.lucent.com/press/0300/00328.bla.html, Mar. 28, 2000 (2 pages).

Simon J.D. Phoenix, Stephen M. Barnett, Paul D. Townsend and K.J. Blow, Multi-user Quantum Cryptography on Optical Networks, Journal of Modern Optical Letter, vol. 42, No. 6, 1995, pp. 1155-1163.

Laser End-Point Detection System, IBM Technical Disclosure Bulletin, vol. 28, No. 7, Dec. 1985, pp. 3151-3163.

E. Rosen, A. Viswanathan and R. Callon, Multiprotocol Label Switching Architecture, Internet Standards Track Protocol, Internet Official Protocol Standards (STD 1), Jan. 2001, pp. 1-61.

P.D. Townsend, J.G. Rarity and P.R. Tapster, Enhanced Single Photon Fringe Visibility in a 10 km-Long Prototype Quantum Cryptography Channel, Electronics Letters, vol. 29, No. 14, Jul. 8, 1993, pp. 1291-1293.

P.D. Townsend, Secure Key Distribution System Based on quantum Cryptography, Electronics Letters, vol. 30, No. 10, May 12, 1994, pp. 809-811.

P.D. Townsend, J.G. Rarity and P.R. Tapster, Single Photon Interference in 10km Long Optical Fiber Interferometer, Electronics Letters, vol. 29, No. 7, Apr. 1, 1993, p. 6334-635.

James A. Walker, Telecommunications Applications of MEMs, mstnews, Mar. 2000, p. 6-9.

Violations of a New Inequality for Classical Fields; Fransom, J.D.; Johns Hopkins University; NTIS-NASA Publication; Goddard Space Flight Center; Workshop on Squeezed States and Uncertainty Relations, Feb. 1991, pp. 23-32.

"Quantum key distribution: Real-time compensation of interferometer phase drift," NTNU Department of Physical Electronics, pp. 1-45.

Bennett, C.H., et al., "Experimental Quantum Cryptography," Journal of Crytopgraphy's special issue after Eurocrypt '90, 28 pages (Sep. 1991).

Bennett, C.H., et al., "Generalized Privacy Amplification," IBM Research, 24 pages (May 31, 1995).

Bennett, C.H., et al., "Quantum Crytopgraphy: Public Key Distribution and Coin Tossing," Proceedings of IEEE International Conference on Computers, Systems & Signal Processing, Bangalore, India, pp. 175-179, Dec. 10-12, 1984.

Brassard, G., et al., "Cryptology Column—25 Years of Quantum Cryptography," Pragocrypt, pp. 13-24 (Jul. 1996).

Brassard, G., et al., "Secret-Key Reconciliation by Public Discussion," Department IRO, Universite de Montreal, 14 pages (1994).

Cabello, A., "Multiparty key distribution and secret sharing based on entanglement swapping," pp. 1-8, (Sep. 7, 2000).

Crepeau, C., et al., "Secure Multi-party Quantum Computation," ACM, pp. 1-10 (2001).

Ekert, A.K., "Quantum Cryptography Based on Bell's Theorem," Physical Review Letters, 67(6):661-663 (1991).

Elliott, B.B., "Path-length control in a interferometric QKD link," Proc. of SPIE, vol. #5101, 11 pages (Apr. 21, 2003).

Elliott, C., "Building the quantum network," New J. Phys., 4:46 (2002).

Franson, J.D., "Bell Inequality for Position and Time," Physical Review Letters, 62(19):2205-2208 (1989).

Gisin, N., et al., "Quantum cryptography and long distance Bell experiments: How to control decoherence," Geneva, Switzerland, pp. 1-7 and 4 pages of drawlings (Jan. 15, 1999).

Gisin, N., et al., "Quantum cryptography," Reviews of Modern Physics, 74:145-184 (2002).

Gottesman, D., et al., "Secure quantum key distribution using squeezed states," pp. 1-19 (Sep. 25, 2000).

Jennewein, T., et al., "Quantum Cryptography with Entangled Photons," Physical Review Letters, 84(20):4729-4732 (2000).

Maurer, U., et al., "Information-Theoretic Key Argeement: From Weak to Strong Secrecy for Free," Computer Science Department, Swiss Federal Institute of Technology, 20 pages (2000).

Maurer, U.M., "Secret Key Agreement by Public Discussion From Common Information," IEEE Transactions on Information Theory, 39:733-742 (1993).

Mo. X., et al., "Intrinsic-Stabilization Uni-Directional Quantum Key Distribution Between Beijing and Tianjin," Key Lab of Quantum Information, Department of Electronic Engineering and Information Science, University of Science and Technology of China, Hefei, Anhui.

Naik, D.S., et al., "Entangled State Quantum Cryptography: Eavesdropping on the Ekert Protocol," Physical Review Letters, 84(20):4733-4736 (2000).

Ribordy, G., et al., "Long-distance entanglement-based quantum key distribution," Physical Review A, vol. 63, 012309-1-012309-12 (2001).

Scarani, V., et al., "Quantum Cryptography Protocols Robust Against Photon Number Splitting Attacks for Week Lazer Pulse Implementations," Physical Review Letters, 92(5):057901-1 through 057901-4 (Feb. 2004).

Scarani, V., et al., "Quantum cryptography protocols robust against photon number splitting attacks," ERATO Conference on Quantum Information Science 2003, Sep. 4-6, 2003, Niijimakaikan, Kyoto Japan; 2 pages.

Schneier, B., "Applied Cryptography," Second Edition, Chapter 10, Oct. 18, 1995, Wiley & Sons Publ., pp. 216-220.

Slusky, B., et al., "Defense frontier analysis of quantum cryptographic systems," Applied Optics, 37(14):2869-2878 (1998).

Stucki, D., et al., "Quantum Key Distiubution over 67 km with a plug&play system," New Journal of Physics, 41.1-41.8 (2002).

Tanzilli, S., et al., "PPLN waveguide for quantum communication," Eur. Phys. J.D., 18:155-160 (2002).

Tittel, W., et al., "Long-distance Bell-type tests using energy-time entanlgled photons," Physical Review A, 59(6):4150-4163 (1999).

Xiao, L., et al., "Effiecient Multi-Party Quantum Secret Sharing Schemes," pp. 1-7 (May 28, 2004).

Degermark, M., et al., "Small Forwarding Tables for Fast Routing Lookups," ACM, pp. 3-14 (1997).

Estrin, D., et al., "Security Issues in Policy Routing," IEEE, pp. 183-193 (1989).

Garcia-Luna-Aceves, J.J., et al., "Distributed, Scalable Routing Based on Vectors of Link States," IEEE Journal on Selected Area in Communications, 13(8):1383-1395 (Oct. 1995).

Garcia-Luna-Aceves, J.J., et al., "Scalable Link-State Internet Routing," Network Protocols (Oct. 13-16, 1998).

Lakshman, T.V., et al., "High-Speed Policy-based Packet Forwarding Using Efficient Multi-dimensional Range Matching," Proceedings of the ACM SIGCOMM'98 conference on Applications, technologies, architectures and protocols for computer communication, pp. 203-214 (1998).

Lampson, B., et al., "IP Lookups Using Multiway and Multicolumn Search," IEEE/ACM Transaction on Networking, 7(3):324-334 (Jun. 1999).

Ramanathan, R., et al., "Hierarchically-organized, multihop mobile wireless networks for quality-of-service support," Mobile Networkds and Applications, 3:101-119 (1998).

Tsai, W.T., "An Adaptive Hierarchical Routing Protocol," IEEE Transactions on Computers, 38(8):1059-1075 (Aug. 1989).

Waldvogel, M., et al., "Scalable High Speed IP Lookups," ACM, pp. 25-36 (1997).

Bowers, J.E., "Optical Networking and Components Trends," UCSB, NSF Workshop, 51 pages.

Honjo, T., et al., "Differential-phase-shift Quantum Key Distribution," NTT Technical Review, 2(12):26-33 (Dec. 2004).

Nambu, Y., et al., "BB84 Quantum Key Distribution System based on Silica-Based Planar Lightwave Circuits," Fundamentals and Environmental research Laboratories and Fiber Optic Devices Division, pp. 1-11.

Paniccia, M., "Silicon Integrated Photonics," UCSB, 30 pages, Feb. 2, 2005.

Tomita, A., et al., "Recent Progress in Quantum Key Transmission," NEC J. of Adv. Tech., 2(1):84-91 (Winter 2005).

Bennett, C.H., "Quantum Cryptography Using Any Two Nonorthogonal States," Physical Review Letters, 68(21):3121-3124 (1992).

Bennett, C.H., et al., "Experimental Quantum Cryptography," J. Cryptology, 5:3-28 (1992).

Butler, W.T., et al., "Free space quantum-key distribution," Physical Review A, 57(4):2379-2382 (Apr. 1998).

Jacobs, B.C., et al., "Quantum cryptography in free space," Optics Letters, 21(22):1854-1856 (Nov. 1996).

Bethune, D.S., et al., An Autocompensating Fiber-Optic Quantum Cryptography System Based on Polarization Splitting of Light, IEEE Journal of Quantum Electronics, 36(3):340-347 (2000).

Imamoglu, A., et al., "Turnstile Device for Heralded Single Photons: Coulomb Blackade of Electron and Hole Tunneling in Quantum Confined p-i-n Heterojunctions," Physical Review Letters, 72(2):210-213 (1994).

Office action issued on Mar. 27, 2008 for U.S. Appl. No. 10/799,177.
Office action issued on Oct. 23, 2007 for U.S. Appl. No. 10/324,355.
Office action issued on Oct. 29, 2007 for U.S. Appl. No. 10/786,314.
Office action issued on Dec. 27, 2007 for U.S. Appl. No. 10/795,313.
Office action issued on Oct. 11, 2007 for U.S. Appl. No. 10/795398.

Gisin, N., et al., "Quantum Cryptography on Noisy Channels: Quantum versus Classical Key-Agreement Protocols," The American Physical Society, vol. 83, No. 20, pp. 4200-4203, Nov. 1999.

Maurer, U.M., et al., "Unconditionally Secure Key Agreement and the Intrinsic Conditional Information," IEEE Transaction on Information Theory, vol. 45, No. 2, pp. 499-514, Mar. 1999.

Shengli, L., et al., "A Practical Protocol for Advantage Distillation and Information Reconciliation," Kluwer Academic Publishers, vol. 30, No. 1, pp. 39-62, 2003.

SECOQC White Paper on Quantum Key Distribution and Cryptography, from the internet at http://www.secoqc.net/downloads/secoqc_crypto_wp.pdf, printed on Nov. 28, 2007.

* cited by examiner

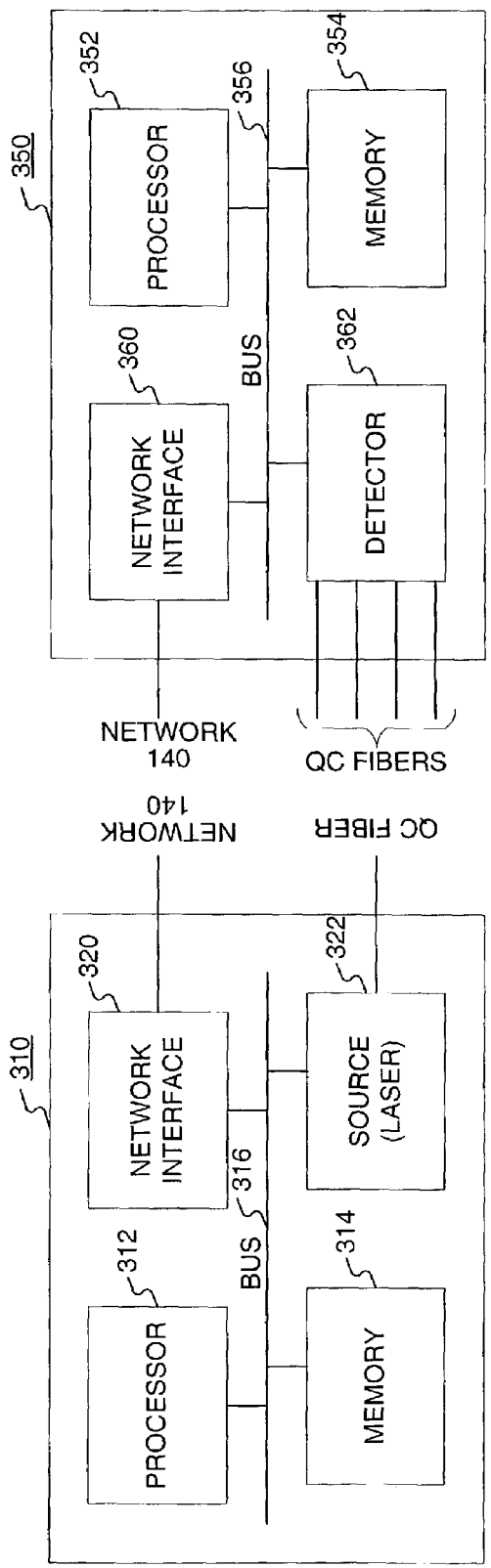
FIG. 3A
FIG. 3C
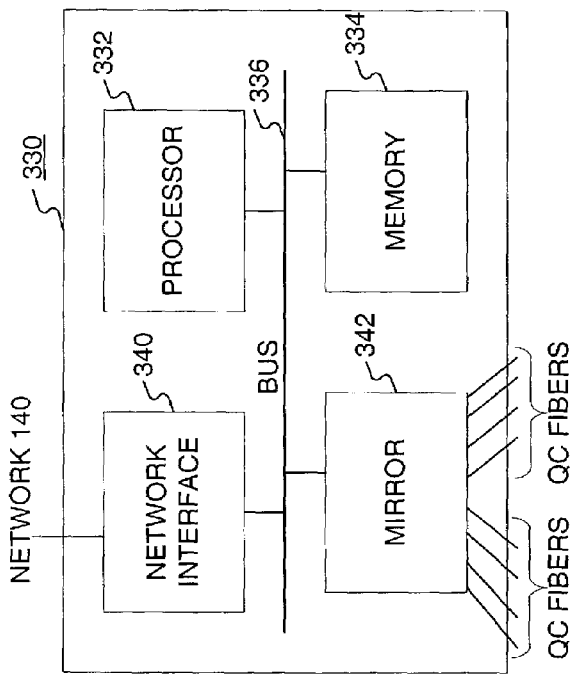
FIG. 3B

KEY DISTRIBUTION CENTER FOR QUANTUM CRYPTOGRAPHIC KEY DISTRIBUTION NETWORKS

FIELD OF THE INVENTION

The present invention relates to methods and systems for using the principles of quantum mechanics to distribute a secret cryptographic key over an insecure network and to share the secret cryptographic key among more than two user devices using a key distribution center.

BACKGROUND OF THE INVENTION

Cryptography is the science of securing information by rendering it unreadable to everyone except the intended recipient of the information. Cryptography also provides a mechanism to ensure that a message is authentic and unmodified. Information that has been cryptographically rendered unreadable may be described as "encrypted," and conversely, unreadable information that is unscrambled and again rendered into readable form may be described as "decrypted." The process of encrypting and decrypting information using traditional cryptographic methods employs at least one piece of information commonly called a "key" because it is used to "unlock" an encrypted message. Cryptography has traditionally been of great importance to persons seeking to communicate secretly. Applications of cryptography range from the protection of private records to secure payment systems.

Symmetric cryptography describes a system of encrypting and decrypting information using the same secret key to perform both encryption and decryption. There are numerous symmetric cryptographic methods, having various characteristics including relative strength, speed of computation, and convenience. The one-time pad offers security that is considered to be unbreakable. However, all symmetric cryptographic methods share a common problem, namely the need to privately and securely exchange information about the symmetric key.

Secure key exchange methods are used to exchange secret cryptographic keys. A traditional solution to this problem is to physically deliver the key via a secure courier. Another method is to use public key cryptography to exchange a symmetric key. Methods of public key cryptography are well known. Yet another method for securely exchanging keys is quantum cryptography.

Quantum cryptography is a technique for the private and secure distribution of a key for use in subsequent encryption and decryption. Quantum cryptography is built upon the principles of quantum mechanics, according to which there is statistical uncertainty regarding the properties of a photon. Furthermore, principles of quantum mechanics require that the act of observing a series of randomly oriented photons necessarily will affect some of the observed photons. This principle is used in quantum cryptography to securely exchange keys, because in observing the states of the transmitted photons, an eavesdropper will detectably corrupt the states of the transmitted photons.

Quantum cryptography (hereinafter, referred to as "QC") key distribution uses individual photons to convey keying information between two devices. In conventional QC techniques, these two devices are directly connected by an optical path, either via directly attached fiber that runs between the devices, or by free-space optical paths. In essence, one device sends a stream of individual photons directly from itself to another device. The transmitted photons have randomly selected quantum bases. Then various protocols are used in order to agree on the quantum state conveyed via these photons and hence to agree on shared keying data. A very high degree of protection is provided by quantum cryptography—in essence, QC key distribution techniques make it impossible for an eavesdropper to gain information about the exchanged cryptographic key without being detected.

Conventional QC technology has a drawback, however, that it is primarily a point-to-point key distribution technique. That is, when an intermediate piece of networking equipment such as a switch is introduced into a quantum cryptography path, the operator of the networking equipment can undetectably break the security of the key exchange. Therefore, known systems require intervening network devices to be brought into the same trusted domain as the endpoint devices, meaning that the network devices must participate in and understand the key distribution process. This is undesirable in many ways, as systems are generally much more secure when users can employ encryption techniques that do not require trusted active participation of additional entities.

The inventor has thus proposed methods and systems for distributing a secret key between two user devices based on the QC principle, over a potentially insecure network using untrusted switches, in U.S. patent application Ser. No. 09/944,328, filed on Aug. 31, 2001, entitled "Quantum Cryptographic Key Distribution Networks with Untrusted Switches," and in U.S. patent application Ser. No. 09/943,709 filed on Aug. 31, 2001, entitled "Systems and Methods for Path Set-Up in a Quantum Key Distribution Network," each of which is expressly incorporated in its entirety herein by reference. In accordance with this proposed methods and systems, the untrusted switches that transfer keying information along a quantum cryptography path are unable to read or alter the contents of any communication between endpoint devices. The untrusted switches in the network can therefore be operated by a person or organization with whom the users of the network do not want to share their secrets in order to communicate securely.

SUMMARY OF THE INVENTION

Methods and systems consistent with the present invention enable a group of three or more user devices to share a common secret key based on the QC principle, over an insecure network including untrusted switches.

In methods and systems consistent with the invention, a key distribution center (KDC) is connected with a network, which includes network devices such as switches. Three or more user devices connected with the network are specified as constituting a secure communication group. Each user device sets up an end-to-end path to the KDC by configuring at least one of the network devices to direct electromagnetic or light information along the path. Thereafter, a user key is established between each user device and the KDC, by sending electromagnetic or light information using randomly selected quantum bases through the path. The KDC determines a shared secret key, and notifies each user device of the shared secret key by sending the result of a calculation based on the shared secret key and each user key through the network. A computer-usable medium consistent with the invention contains instructions for causing a computer to perform a method consistent with the invention.

An apparatus consistent with the invention functions as a user device communicating with a KDC in a network in which key information is distributed by securely transmitting electromagnetic or light information along a path comprised of a plurality of network devices. The apparatus comprises an electronic network interface for exchanging information other than the electromagnetic or light information, and a quantum cryptographic interface for establishing a user key by electromagnetic or light information transmitted through the path using randomly selected quantum bases. The apparatus further comprises a computing module for setting up an end-to-end path between the KDC and the apparatus by configuring at least one of the network devices to direct electromagnetic or light information along the path. The electronic network interface receives from the KDC the result of a calculation based on a shared secret key and the user key, and the computing module obtains the shared secret key by performing an operation on the result received using the user key.

BRIEF DESCRIPTION OF THE DRAWINGS

The accompanying drawings provide a further understanding of the invention and are incorporated in and constitute a part of this specification. The drawings illustrate various embodiments of the invention and, together with the description, serve to explain the principles of the invention.

FIGS. 3A, 3B, and 3C are block diagrams illustrating a user device, a networking switch, and a key distribution center (KDC), respectively, all of which are consistent with the invention.

DETAILED DESCRIPTION

The following detailed description refers to the accompanying drawings. Although the description includes exemplary implementations, other implementations are possible and changes may be made to the implementations described without departing from the spirit and scope of the invention. The following detailed description does not limit the invention. Instead, the scope of the invention is defined by the appended claims. Wherever possible, the same reference numbers will be used throughout the drawings and the following description to refer to the same or like parts.

First, quantum cryptographic key distribution between two devices via untrusted switches is described below, with reference to FIG. 1. This distribution between two devices can be used in methods and systems consistent with the invention to share a QC key among three or more devices, as will be described with reference to FIG. 2 and its succeeding figures.

Figure 1:
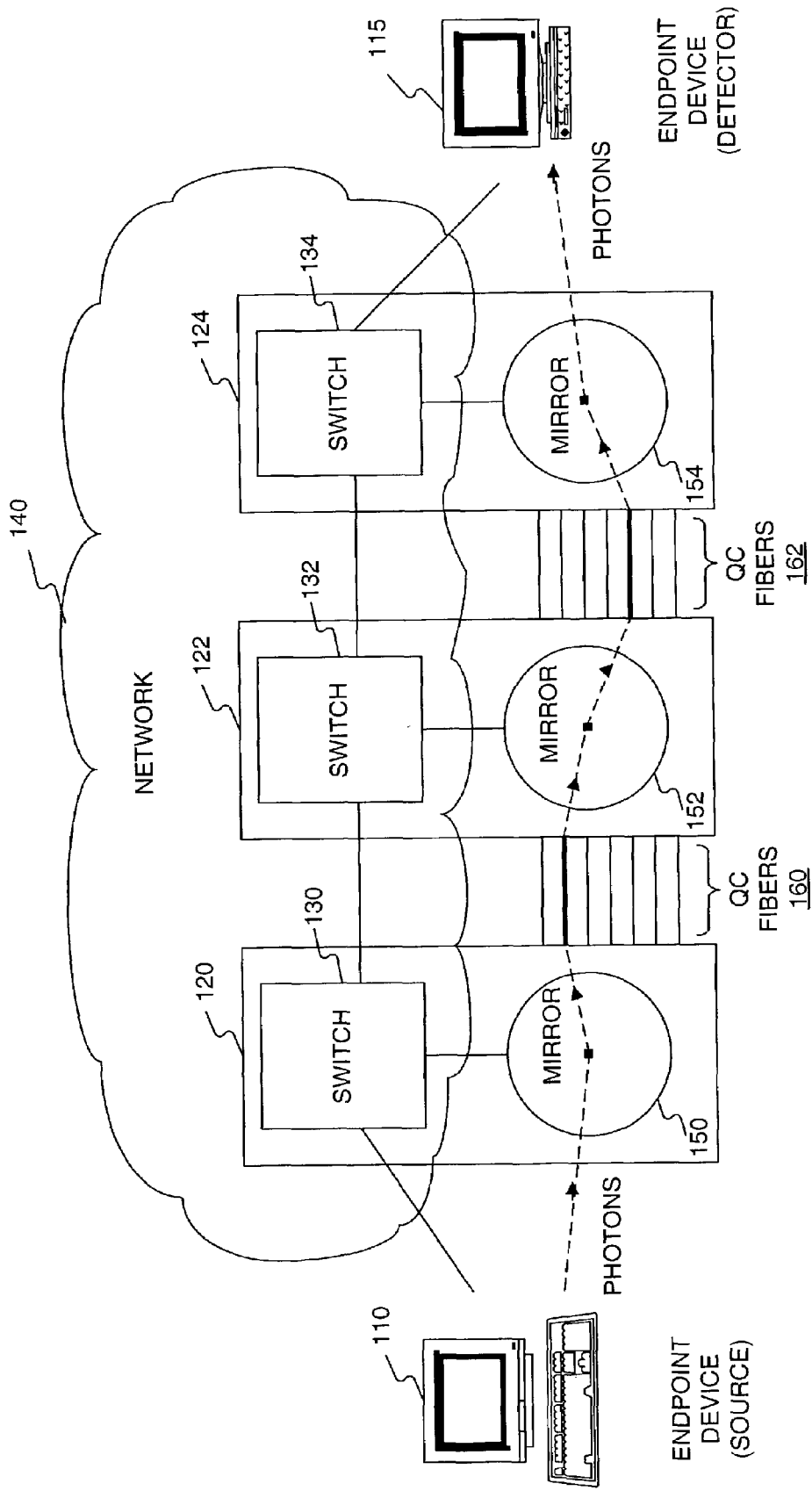
FIG. 1 illustrates quantum cryptographic key distribution between two devices via untrusted switches consistent with the invention.

In FIG. 1, an endpoint device (source) 110 such as a computer system including appropriate optical components (not shown) sends a series of photons or light pulses having characteristics similar to a series of photons, and an endpoint device (detector) 115 such as a computer system including appropriate optical components (not shown) receives these photons. The endpoints 110 and 115 use these photons to convey keying information. On the quantum cryptography path, there are switches equipped with mirror elements (hereinafter, referred to as "mirror switch") 120, 122, and 124.

A switch 130 in mirror switch 120, a switch 132 in mirror switch 122, and a switch 134 in mirror switch 124 are a part of a network 140, which accommodates endpoint devices 110 and 115. Network 140 may be implemented using known means, such as, for example, IP, ATM, or SONET, and is used in transferring messages for setting up the mirror elements on the quantum cryptography path.

A mirror element 150 in mirror switch 120, a mirror element 152 in mirror switch 132, and a mirror element 154 in mirror switch 134 are optically connected through QC fibers 160 and 162, and constitute the quantum cryptography path for conveying photons from endpoint device 110 to endpoint device 115. QC key information is thus transferred through mirror 150, a selected one of QC fibers 160, mirror 152, a selected one of QC fibers 162, and mirror 154. After acquiring the common QC key, two devices 110 and 115 can perform secure communication with each other by known cryptographic methods using the QC key over network 140. Network 140 may also be used in transferring a public portion of QC key distribution, whereas the secret QC key information is transferred through the quantum cryptography path.

Mirror elements 150, 152, and 154 may be implemented by Micro-Electro-Mechanical Systems ("MEMS") technology to reflect the photons from source 110 to detector 115. The MEMS technology provides mirror arrays that are used for optical switching in an optical networking environment, and can be applied to optical fiber telecommunications systems, including optical cross-connects ("OXC"). Alternatively, instead of MEMS reflectors, switches 120, 122, and 124 may employ other known reflective devices, such as photonic-band-gap material, that redirect optical energy.

Because the mirror elements in the switches passively redirect light from one fiber strand to another, they cannot read or alter the photons' quantum state. Hence the switches need not be part of the trusted domain; the photons are created and observed only at endpoint devices, and if a switch attempts to observe the photons, the observation will be detected, consistent with the QC principle.

A QC key is distributed through the above-established quantum cryptography path as follows. Sender 110 produces a random bit string, and randomly selects a quantum basis, e.g., a rectilinear polarization or a diagonal polarization, for each bit in the random bit string. Those randomly-selected quantum bases are called "random sending bases." Sender 110 then transmits photons or light pulses, each of which represents a corresponding bit in the random bit string in the selected quantum basis. For example, if the bit is zero and the selected basis is rectilinear-oriented, a horizontal photon is sent. If the bit is zero and the selected basis is diagonal-oriented, a 45-degree photon is sent. If the bit is one and the selected basis is rectilinear-oriented, a vertical photon is sent. If the bit is one and the selected basis is diagonal-oriented, a 135-degree photon is sent.

Receiver 115 observes each of the received photons with a randomly oriented basis. The randomly-selected quantum bases used in observing the photons are called "random receiving bases," and selected independently of sender 110. Receiver 115 measures the photon's quantum state based on the selected orientation, which results in a binary zero or one. Receiver 115 obtains original bits only from the photons for which receiver 115 incidentally uses the same orientation basis as sender 110. To investigate which photons receiver 115 uses the correct quantum bases, receiver 115 reports the random receiving bases to sender 110, and sender 110 reports back the coincidence with the random sending bases to receiver 115. The communication for this investigation can be performed through a separate public channel, e.g., network 140.

To detect eavesdropping in the quantum channel, sender 110 and receiver 115 compare a random subset of the bits transmitted as the photons' quantum state, using the public channel. User devices 110 and 115 then determine whether there had been significant errors or eavesdropping in the quantum channel through mirrors 150, 152, and 154, based on the result of comparison. If it is determined that a sufficiently small number of the compared bits were wrong, user devices 110 and 115 discard the compared bits and use the remaining bits of the photons' quantum state as key information for conducting encrypted communications over the public channel.

The quantum cryptography path is established by properly arranging mirror elements 150, 152, and 153, so that photons can travel from computer 110 to computer 115 along this path. The mirror arrangement process is coordinated by a series of control or setup messages that travel through corresponding switches 130, 132, and 134 over network 140. The setup messages may be exchanged using known protocols such as, for example, the Constraint-based Routing Label Distribution Protocol ("CR-LDP") or the Resource Reservation Protocol ("RSVP"), between endpoint devices via intermediate network switches. The setup messages contain information necessary to adjust the mirror array configuration, producing the quantum cryptography path, which becomes a trusted path through untrusted network devices. Upon completion of the QC key distribution between the endpoint devices using the quantum cryptography path, this path is torn down in accordance with messages exchanged through corresponding switches 130, 132, and 134.

As described above, the mirror switches controlled by the setup messages enable arbitrary paths to be formed between one endpoint device and another in a QC key distribution network. The QC key distribution network comprises not only QC fibers and mirrors for transferring photons' quantum state, but also a switched network in which messages and data are transferred and each switch controls its associated mirror array. According to the QC key distribution network techniques, eavesdropped paths can be routed around, and any two parties can economically and securely agree upon a secret key without requiring a direct point-to-point link between them.

Methods and systems consistent with the invention use, in the above-described QC key distribution network, a key distribution center (KDC) that acts as a trusted intermediary and ensures that three or more user devices all share a common secret key. This feature is useful for those cases in which more than two devices wish to share a key, e.g., in setting up the keying material for virtual private networks that link multiple distinct private enclaves.

Figure 2:
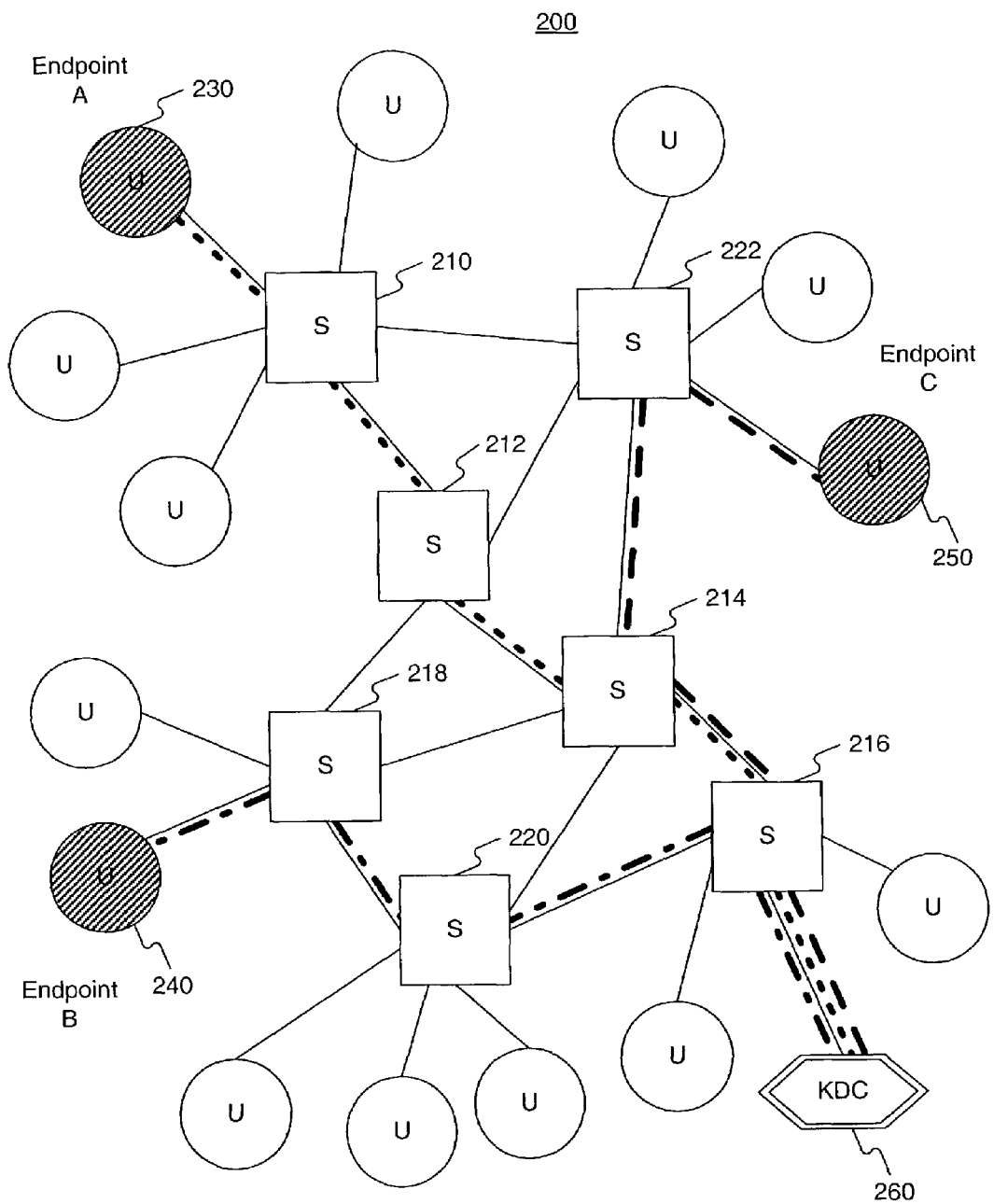
FIG. 2 illustrates a network in which methods and systems consistent with the invention may operate.

FIG. 2 illustrates an exemplary QC key distribution network 200 in which methods and systems consistent with the invention operate. Switches (S) 210, 212, 214, 216, 218, 220, and 222 are illustrative mirror switches, each of which operates like mirror switches 120, 122, or 124 in FIG. 1. User endpoints are represented by circles (U) in FIG. 2, each of which includes basically the same structure and function as endpoint device 110 or 115 in FIG. 1. Connections among switches and user endpoints in network 200 represent both QC fibers optically connected with mirror elements (150, 160, 152, 162, and 154 in FIG. 1) and a switched network (140 including 130, 132, and 134 in FIG. 1).

According to methods and systems consistent with the invention, a KDC 260 is added to network 200. As is apparent to one ordinarily skilled in the art, instead of a single KDC, two or more KDCs may be added to network 200 to cooperate in having a secret key shared within a group of user endpoints. In this example, user device 230 (endpoint A), user device 240 (endpoint B), and user device 250 (endpoint C) constitute a secure communication group, and a process in which all endpoints A, B, and C come to share a single secret key for the secure communication with the help of KDC 260 will be described below. One ordinarily skilled in the art can easily apply this process to a case in which four or more user endpoints wish to share a key.

FIGS. 3A, 3B, and 3C illustrate exemplary structures of a user device 310 (devices 230, 240, and 250 in FIG. 2), a networking switch 330 (switches 210, 212, 214, 216, 218, 220, and 222 in FIG. 2), and a KDC 350 (KDC 260 in FIG. 2), respectively. User device 310 may be a personal computer, a web server, or other computer system such as a firewall. User device 310 includes a processor 312 and a memory 314, wherein processor 312 performs methods consistent with the invention according to instructions stored in memory 314. A bus 316 connects processor 312 and memory 314 with a network interface 320 and a source of photons (in this case, a laser) 322 in user device 310. Network interface 320 is used to electronically connect user device 310 with switched network 140 for the exchange of setup messages and other data. Laser 322 is used to send photons or light pulses having randomly selected quantum bases through a QC fiber.

Networking switch device 330 includes a processor 332 and a memory 334, wherein processor 332 performs methods consistent with the invention according to instructions stored in memory 334. A bus 336 connects processor 332 and memory 334 with a network interface 340 and a mirror element 342, e.g., MEMS mirror array, in switch device 330. Network interface 340 is used to accommodate switch device 330 in switched network 140 for the exchange of setup messages and other data. Mirror element 342 is used to reflect photons or light pulses from one of the QC fibers to another.

KDC 350 is a computer system that includes a processor 352 and a memory 354, wherein processor 352 performs methods consistent with the invention according to instructions stored in memory 354. A bus 356 connects processor 352 and memory 354 with a network interface 360 and a detector of photons 362 in KDC device 350. Network interface 360 is used to electronically connect KDC device 350 with switched network 140 for the exchange of setup messages and other data. Detector 362 is used to observe photons or light pulses received through a QC fiber.

Since KDC 350 will receive photons including keying information from a number of user devices, detector 362 may be structured as corresponds to multiple QC fibers. However, in alternative embodiments, instead of using multiple fibers, dense wavelength division multiplexing ("DWDM") technology or time division multiplexing ("TDM") technology can be employed within a single fiber.

Figure 4:
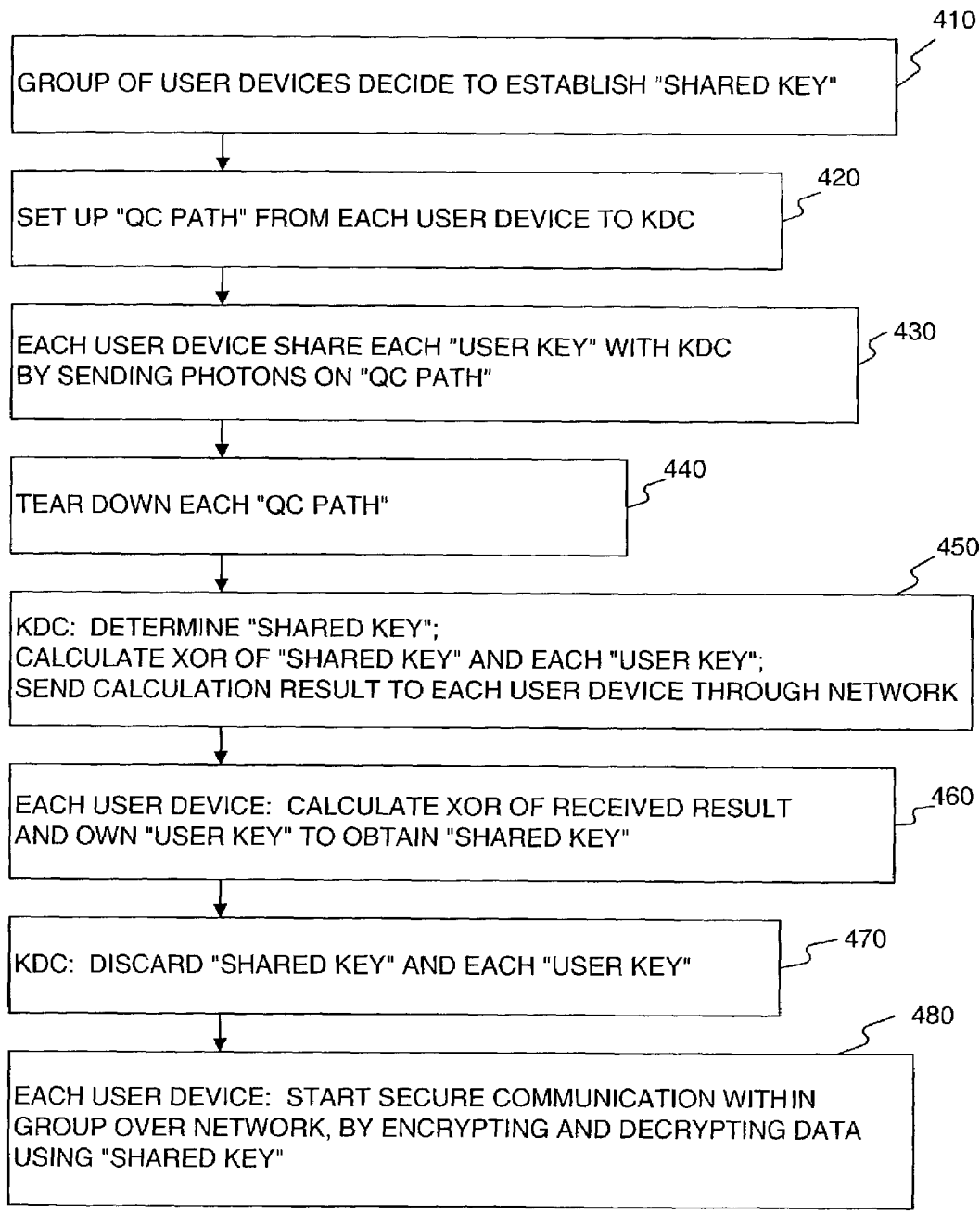
FIG. 4 is a flowchart showing operations consistent with the invention for sharing a QC key among three or more user devices through the KDC.

FIG. 4 shows exemplary operations among user devices 230 (endpoint A), 240 (B), 250 (C), and KDC 260 to share a common key, consistent with the invention, as seen in FIG. 2. First, endpoints A, B, and C decide among themselves that they need to establish a shared key in order to communicate securely (step 410). This decision can be made through network 140 as shown in FIG. 1, by open communication, by using a pre-arranged key, by pair-wise secret communication, or any other convenient means.

Then, each of the user devices, in turn, uses QC key distribution network 200 to establish a secret key with KDC 260. In QC key distribution network 200, an end-to-end path for quantum photons may be set up from any endpoint device to any other endpoint device. Here, as shown in FIG. 2 in dotted lines, each of the endpoints A, B, and C sets up a path through QC key distribution network 200 in order to exchange keying material with KDC 260 (step 420). The path setup is performed by transferring setup messages from each user device to KDC 260, through mirror switches along the path, as described with reference to FIG. 1.

A QC key is then distributed through the QC path using photons or light pulses, as described with reference to FIG. 1, by operating each user device as sender 110 and KDC 260 as receiver 115 (step 430). Thus, endpoint A shares its user key ("A-Key") with KDC 260, endpoint B shares its user key ("B-Key") with KDC 260, and endpoint C shares its user key ("C-Key") with KDC 260. In general, each of these keys will be different, but have the same length, which is the length of the desired shared key (e.g. 1,000 bits or whatever). After KDC 260 acquires each of the above three distinct keys, each QC path corresponding to the acquired key is torn down by exchanging messages among the mirror switches along the path (step 440).

Next, all three devices agree on a single, shared, secret key as follows. In this example, KDC 450 selects the A-Key as the shared key (step 450). KDC 450 then performs an exclusive-or operation of its copies of the A-Key and the B-Key to produce a new set of bits, namely, the A×B-Key (step 450). KDC 450 sends this new key to endpoint B, as encrypted by a pre-arranged key, or even in the clear (step 450). The contents of this A×B-Key are useless without knowing either the A-Key or the B-Key, and therefore the A×B-Key can be sent through network 140 rather than a QC path.

Endpoint B that receives the A×B Key performs an exclusive-or operation of the A×B-Key with its own B-Key (step 460). The result will be the A-Key. Thus endpoints A and B now share the A-Key as a common secret key. KDC 450 repeats step 450 for endpoint C, using the C-Key instead of the B-Key. Endpoint C then performs step 460, and as a result it too will have a local copy of the A-Key. As for endpoint A, KDC 450 sends a message indicating that the common secret key has been determined to be the user key of endpoint A.

The KDC may now discard its copy of the A-Key, B-Key, and C-Key (step 470). As a result, endpoints A, B, and C share a common, secret key (in this example, the A-Key), and may now use this key to initialize their cryptographic algorithms, for one-time pads, or for any other means of communicating via a shared key (step 480).

In other examples, all user devices in the group may agree on the B-Key, or the C-Key. Yet alternatively, KDC 260 may generate a random number of the appropriate length (e.g. 1,000 bits) that would act as the shared secret key. KDC 260 may then exclusive-or this random key (R-Key) with the A-Key, send the AxR-Key result to user device A, and perform similar steps for user devices B and C. As a result, all devices would then wind up with a shared R-Key once they had exclusive-or'd with their own internal keys.

The above-described combination of the QC key distribution network with the KDC is advantageous in that a number of endpoint devices can all communicate with a single or multiple KDCs without a separate fiber-optic link from each device to the KDC. The KDC can be built with a single source or detector, which is then switched to user devices in turn. Alternatively, the KDC can be built with two or more sources or detectors, which can then be used in parallel by two or more user devices for key exchange.

If the QC key distribution network contains multiple KDCs, a robust key-exchange system in which key exchange services can still be provided even if one or more of the KDCs fail can be realized. As with any networked service, the user devices can learn which KDCs are available, and all agree on one of the operational KDCs as their key exchange point. At the same time, since a single KDC may satisfactorily act as an exchange point for any consenting group of user devices, it is not necessary to establish special KDCs for each group that wishes to share a key. Such groups of user devices can be arbitrarily created on an "as needed" basis, while a single KDC can be employed for any, arbitrary exchange of group keys. This feature enables KDCs, which are probably high-security devices, to be protected behind locked doors, under armed guard, and so forth.

Persons of ordinary skill will realize that many modifications and variations of the above embodiments may be made without departing from the novel and advantageous features of the present invention. For example, each user device 310 has a laser and KDC 350 has a detector or detectors in the above embodiments. In alternative embodiments, however, KDC 350 may have a laser or lasers and each user device 310 may have a detector, or both may have lasers and detectors in a mix. The devices having lasers will produce a random bit string, a part of which becomes a secret key, to send photons or light pulses representing the bit string on random quantum bases.

Moreover, sources of photons other than lasers can be used, whereby the wavelength or frequency of such other photons fall into wavelength or frequency bands outside of the optical (human-visual) spectrum. In other words, the wavelengths can be in the infrared and ultraviolet regions and beyond. The present invention is not frequency-constrained with respect to the electromagnetic energy with which it operates.

Furthermore, in the above embodiments, the polarization of photons is used as the quantum basis of photons. In alternative embodiments, the phase of photons may be used as the quantum basis, with the technique known as "Mach-Zehnder interferometer" for quantum cryptography. Yet alternatively, "plug and play" systems for quantum cryptography can be used in distributing a QC key through a quantum cryptography path established as described above. This "plug and play" technique is described in, for example, A. Muller et al., "'Plug and play' systems for quantum cryptography," Appl. Phys. Lett. 70(7), pp. 793-795 (February 1997), and N. Gisin et al., "Quantum cryptography," Reviews of Modern Physics (January 2001), which are both hereby incorporated by reference.

Exemplary implementation of the "plug and play" system with phase-coding is as follows. KDC 350 is equipped with source (laser) in addition to detector 362, as a receiver-side device. User device 310 is equipped with a special type of mirror instead of source (laser) 322, as a sender-side device. The sender randomly selects its quantum bases, e.g., phase settings, which correspond to the random bit string for a QC key. In this system, the source (laser) of the receiver (KDC 350) first transmits photons or light pulses to the sender. The light information transmitted from the receiver to the sender does not carry any QC key information yet.

Thereafter, the special type of mirror of the sender (user device 310) reflects the photons from the receiver while modulating the phase of the photons according to the quantum bases selected randomly as above. The bit string for a QC key are thus encoded in the phase shifts of the photons bounced back to the receiver.

The receiver also randomly selects its quantum bases, e.g., phase settings, independently of the sender. The photon detector of the receiver (KDC 350) observes the photons from the sender with the receiver-side randomly-selected bases. If a receiver-side basis coincides with a corresponding sender-side basis, a constructive interference will be observed in the detector, and thus an identical bit will be acquired by the sender and the receiver. The sender and the receiver then communicate with each other to construct a QC key out of the identical bits acquired securely by both sides.

Another way to implement the "plug and play" system may be forming KDC 350 as the sender-side device (with the special type of mirror) and user device 310 as the receiver-side device (with the source and the detector).

Accordingly, all such modifications and variations are intended to be included within the scope of the appended claims. The specification and examples are only exemplary. The following claims define the true scope and sprit of the invention.

What is claimed is:

1. A method of distributing key information by securely transmitting light information in a network along a path comprised of a plurality of network devices, said network devices comprising a plurality of switching devices, said method comprising:

specifying a plurality of user devices connected with the network, said user devices constituting a secure communication group;

setting up a plurality of paths through said network by sending at least one setup message from the respective user devices to said network devices, based on said setup message, configuring said network devices to direct said light information along a corresponding one of said paths, each of said paths being an end-to-end path between each of said user devices and a key distribution center device connected with the network using said switching devices;

establishing a plurality of user keys, each user key corresponding to a respective user device, by sending the light information using randomly selected quantum bases through said paths, each of said user keys being acquired by said respective user devices and the key distribution center device;

determining a shared secret key at the key distribution center device; and notifying each of said user devices of the shared secret key by sending the result of a calculation based on the shared secret key and the corresponding user key for each respective user device through the network.

2. The method of claim 1, wherein the step of establishing includes for each one of the user keys:

determining a plurality of bits at a sender side;

creating the light information representing the plurality of bits using a sender-side randomly selected quantum bases;

measuring a quantum state of the light information using a receiver-side randomly selected quantum bases; and acquiring a part of the plurality of bits from the quantum state at a receiver side, as said one of the user keys.

3. The method of claim 2, wherein the step of creating includes: receiving photons or light pulses from the receiver side; and creating the light information representing the plurality of bits by modulating the received photons or light pulses based on the plurality of bits.

4. The method of claim 2, wherein the step of establishing further includes:

determining whether each one of the sender-side randomly selected quantum bases has an equivalent orientation to a corresponding one of the receiver-side randomly selected quantum bases; and discarding a part of the quantum state for which a corresponding one of the receiverside randomly selected quantum bases has been determined to be different from said one of the sender-side randomly selected quantum bases, thereby producing a stream of remaining bits.

5. The method of claim 4, wherein the step of establishing further includes:

comparing a receiver-side value of a random subset of said stream of remaining bits with a sender-side value of said random subset, to determine whether or not to establish a user key from the light information sent and received; and if it is determined to establish the user key, creating said part of the plurality of bits based on said stream of remaining bits by discarding said random subset.

6. The method of claim 1, wherein the light information comprises photons or light pulses representing characteristics of the photons.

7. The method of claim 1, wherein each of said paths is multiplexed onto a fiber with at lease one other quantum-cryptographic signal.

8. The method of claim 1, wherein each of said network devices comprises:

a switch for exchanging information other than the light information through the network; and a mirror element for reflecting the light information from one fiber to another fiber, and wherein the mirror element is controlled by a signal from the switch such that said one fiber, the mirror element, and said another fiber form the path for securely transmitting the light information.

9. The method of claim 8, wherein configuring said network devices comprises sending the signal to the mirror element based on said at least one setup message.

10. The method of claim 8, wherein the step of notifying includes transferring the result of calculation by the switch, in a direction from the key distribution center device to each respective user device.

11. The method of claim 1, wherein the step of notifying includes creating the result of calculation by performing an exclusive-or operation on the shared secret key and each corresponding user key, and each of said user devices performs an exclusive-or operation on a corresponding one of the result of calculation and the user key corresponding to the respective user device to obtain the shared secret key.

12. The method of claim 1, further comprising discarding the shared secret key and said user keys at the key distribution center; and starting the secure communication among said user devices using the shared secret key.

13. The method of claim 1, wherein at least one of the end-to-end paths includes an intermediate network device between one of the user devices and the key distribution center.

14. An apparatus for functioning as a key distribution center in a network in which key information is distributed by securely transmitting light information along a path comprised of a plurality of network devices, said network devices comprising a plurality of switching devices said apparatus comprising:

an electronic network interface for exchanging information other than the light information with the network;

a computing module for specifying a plurality of user devices connected with the network, said user devices constituting a secure communication group, and for setting up a plurality of paths through said network by sending at least one setup message from the respective user devices to said network devices, based on said setup message, configuring said network devices to direct said light information along a corresponding one of said paths, each of said paths being an end-to-end path between each of said user devices and the apparatus using said switching devices; and a quantum cryptographic interface for establishing a plurality of user keys by light information transmitted through said paths using randomly selected quantum bases, each of said user keys corresponding to and being acquired by a respective user device and the apparatus, and wherein the computing module further determines a shared secret key, and notifies each of said user devices of the shared secret key by sending the result of a calculation based on the shared secret key and the user key corresponding to each respective user device through the electronic network interface.

15. The apparatus of claim 14, wherein the electronic network interface is connected with at least one switch in at least one of said network devices, the switch being configured to exchange information other than the light information over the network, and the light information used in the quantum cryptographic interface has been transferred by at least one mirror element in said at least one of said network devices, the mirror element being configured to reflect the light information.

16. The apparatus of claim 14, wherein the computing module discards the shared secret key and said user keys in the apparatus, when the secure communication using the shared secret key becomes available among said user devices.

17. The apparatus of claim 14, wherein the quantum cryptographic interface determines a plurality of bits and creates the light information representing the plurality of bits using a sender-side randomly selected quantum bases, when each of said user device measures a quantum state of the light information using a receiver-side randomly selected quantum bases and acquires a part of the plurality of bits from the quantum state as said one of the user keys.

18. The apparatus of claim 14, wherein, when each of said user device determines a plurality of bits and creates the light information representing the plurality of bits using a sender-side randomly selected quantum bases, the quantum cryptographic interface measures a quantum state of the light information using a receiver-side randomly selected quantum bases and acquires a part of the plurality of bits from the quantum state as said one of the user keys.

19. The method of claim 14, wherein at least one of the end-to-end paths includes an intermediate network device between one of the user devices and the apparatus.

20. An apparatus for functioning as a user device communicating with a key distribution center in a network in which key information is distributed by securely transmitting light information along a path comprised of a plurality of network devices, said network devices comprising a plurality of switching devices, said apparatus comprising:
an electronic network interface for exchanging information other than the light information with the network;
a computing module for specifying a plurality of user devices connected with the network, said user devices and the apparatus constituting a secure communication group, and
for setting up a plurality of paths through the network, each of said paths being an end-to-end path through the network between the key distribution center and the apparatus by sending at least one setup message from the respective user devices to said network devices, based on said setup message, configuring said network devices to direct said light information along said end-to-end path using said switching devices and
a quantum cryptographic interface for establishing a user key by light information transmitted through said path using randomly selected quantum bases, said user key being acquired by the key distribution center and the apparatus,
and wherein the electronic network interface receives from the key distribution center the result of a calculation based on a shared secret key and said user key, and the computing module obtains the shared secret key by performing an operation on the result received using said user key.

21. The method of claim 20, wherein the end-to-end path includes an intermediate network device between the key distribution center and the apparatus.

22. A computer-usable medium containing instructions for causing a computer to perform a method of distributing key information by securely transmitting light information in a network along a path comprised of a plurality of network devices, said network devices comprising a plurality of switching devices, said method comprising:
specifying a plurality of user devices connected with the network, said user devices constituting a secure communication group;
setting up a plurality of paths through said network by sending at least one setup message from the respective user devices to said network devices, based on said setup message, configuring said network devices to direct said light information along a corresponding one of said paths, each of said paths being an end-to-end path between each of said user devices and a key distribution center device connected with the network using said switching devices;
establishing a plurality of user keys, each user key corresponding to a respective user device, by sending the light information using randomly selected quantum bases through said paths, each of said user keys being acquired by said respective user devices and the key distribution center device;
determining a shared secret key at the key distribution center device; and
notifying each of said user devices of the shared secret key by sending the result of a calculation based on the shared secret key and the corresponding user key for each respective user device through the network.

23. The method of claim 22, wherein at least one of the end-to-end paths includes an intermediate network device between one of the user devices and the key distribution center.

* * * * *